(12) United States Patent
Oles et al.

(10) Patent No.: US 6,599,062 B1
(45) Date of Patent: Jul. 29, 2003

(54) COATED PCBN CUTTING INSERTS

(75) Inventors: Edward J. Oles, Ligonier, PA (US); Kent L. Reiner, Latrobe, PA (US); Alfred S. Gates, Jr., Greensburg, PA (US); Edward T. Mohrbach, Irwin, PA (US)

(73) Assignee: Kennametal PC Inc., Monrovia, CA (US)

( * ) Notice: Subject to any disclaimer, the term of this patent is extended or adjusted under 35 U.S.C. 154(b) by 0 days.

(21) Appl. No.: 09/571,695

(22) Filed: May 15, 2000

Related U.S. Application Data

(63) Continuation-in-part of application No. 09/330,631, filed on Jun. 11, 1999, now abandoned.

(51) Int. Cl.[7] .................... B23B 27/14; B23P 15/28
(52) U.S. Cl. .................. 407/119; 407/118; 428/698
(58) Field of Search .................... 407/118, 119, 407/120; 408/144, 145; 428/697, 698, 699

(56) References Cited

U.S. PATENT DOCUMENTS

| | | | |
|---|---|---|---|
| 5,228,812 A | 7/1993 | Noguchi et al. | 408/144 |
| 5,330,853 A | 7/1994 | Hofmann et al. | 428/697 |
| 5,478,634 A | 12/1995 | Setoyama et al. | 428/216 |
| 5,503,913 A | 4/1996 | König et al. | 428/216 |
| 5,597,272 A * | 1/1997 | Moriguchi et al. | 407/119 |
| 5,624,766 A | 4/1997 | Moriguchi et al. | 428/547 |
| 5,676,496 A * | 10/1997 | Littecke et al. | 407/118 |
| 5,700,551 A | 12/1997 | Kukino et al. | 428/212 |
| 5,707,185 A * | 1/1998 | Mizutani | 407/119 X |
| 5,712,030 A | 1/1998 | Goto et al. | 428/332 |
| 5,722,803 A | 3/1998 | Battaglia et al. | 407/119 |
| 5,833,021 A * | 11/1998 | Mensa-Wilmot et al. | 175/433 |
| 5,853,268 A * | 12/1998 | Simpson | 407/118 X |
| 5,853,873 A | 12/1998 | Kukino et al. | 428/336 |
| 5,879,823 A | 3/1999 | Prizzi et al. | 428/698 |
| 5,882,777 A | 3/1999 | Kukino et al. | 428/216 |
| 5,948,716 A * | 9/1999 | Kume et al. | 501/96.4 |
| 5,981,416 A * | 11/1999 | Kume et al. | 501/96.1 |
| 6,045,440 A * | 4/2000 | Johnson et al. | 407/118 X |

FOREIGN PATENT DOCUMENTS

| | | |
|---|---|---|
| EP | 0102843 | 8/1989 |
| JP | 598679 | 1/1984 |
| JP | 61183187 | 8/1986 |
| JP | 1-96083 | 4/1989 |
| JP | 1-96084 | 4/1989 |
| JP | 7-24606 | 1/1995 |
| JP | 2000-44370 | 2/2000 |
| WO | WO93/04015 | 3/1993 |
| WO | WO94/04316 | 3/1994 |

OTHER PUBLICATIONS

Ikeda, Dr. Tsutomu et al., "New Generation Anti–Wear Coatings for Cutting Tools," Kobelco Technology Review, No. 17, Apr. 1994, pp. 5–10.

* cited by examiner

*Primary Examiner*—Henry W. H. Tsai
(74) *Attorney, Agent, or Firm*—John J. Prizzi

(57) ABSTRACT

A cutting tool and method for machining hardened steel including a substrate of polycrystalline cubic boron nitride having one or more layers of a hard refractory coating containing aluminum. The coating may contain a titanium aluminum nitride layer applied by a physical vapor deposition (PVD). Alternatively, the coating may include a layer of aluminum oxide applied by chemical vapor deposition.

35 Claims, 1 Drawing Sheet

COATED PCBN CUTTING INSERTS

The present patent application is a continuation-in-part of application U.S. application Ser. No. 09/330,631, filed Jun. 11, 1999, now abandoned.

BACKGROUND OF THE INVENTION

1. Field of the Invention

The present invention relates to cutting tools, more particularly to cutting tool inserts for machining hardened steel.

2. Prior Art

It is well-known to form superhard cutting tools from a carbide tool insert having a pocket or slot defined therein. A superhard cutting element, sometimes referred to as a blank, is fixed into the pocket, typically by brazing. It is also known to coat cutting tools with a wear-resistant layer to enhance the life of the cutting tool. The material of such cutting tool substrates have included tool steels, cemented carbides, cermets, ceramics, ceramic composites, polycrystalline diamond and polycrystalline cubic boron nitride. The substrates are typically coated with a wear-resistant compound such as TiN, TiCN, TiOCN, TiC, $Al_2O_3$ or a combination thereof.

The life of the cutting tool is often related to the thickness of the wear-resistant coating. Thicker coatings wear through to the substrate slower than thinner coatings. One problem with thicker PVD coatings (i.e., greater than 5 micrometers) is that high stress distributions develop in the coating which may cause the coating to One solution to the problem of coating delamination was proposed in commonly owned U.S. Pat. No. 5,722,803, which is incorporated by reference herein. The '803 patent describes PVD TiAlN coatings with thicknesses of greater than 5 micrometers deposited on cemented carbide substrates, particularly cobalt cemented tungsten carbide. These coatings may be applied in single or multiple layers using chemical vapor deposition (CVD) or physical vapor deposition (PVD) techniques, such as sputtering, ion plating and cathodic arc deposition or a combination of these techniques. The rake face of the substrate is roughened to have a surface roughness in the range of 15 microinches $R_a$ to 125 microinches $R_a$ as measured on a Sheffield Proficorder Spectre Unit. Roughening of the rake face of the substrate is believed to promote good mechanical adhesion of the coating onto the rake face of the substrate.

The cutting tools described in the referenced U.S. Pat. No. 5,722,803 have typically been useful for machining of relatively soft metals such as mild steels (e.g., AISI 1008 and AISI 1045 steel), cast iron, aluminum alloys, magnesium alloys, copper and brass alloys. The roughened rake face surface also has improved chip formation in machining these soft materials. However, hard turning of materials having a Rockwell hardness (HRC) of greater than 45 $R_c$, such as hardened tool and die steels, remains problematic. Cutting tools used to finish machine hardened tool and die steels often have short useful lives due to wear.

An alternative to machining hard materials is grinding. However, grinding requires the use of lubricating fluids which are difficult to dispose of in an environmentally sound manner. Therefore, dry hard turning remains preferred over grinding, despite the costs associated with replacing worn cutting tools, because the expenses associated with the use and disposal of lubricating fluids are avoided.

PCBN cutting tools used in hard turning typically experience wear on the rake and flank surfaces, commonly referred to as crater wear and flank wear, respectively. Crater wear is believed to be a result of chemical interaction between the rake surface of the tool and the metal chip produced during machining. Cutting tools used in hard turning are also subject to flank wear caused by abrasion of the work piece itself against the flank surface of the cutting tool. The wear of cutting tools worsens with cutting time until the work piece loses the desired size and/or finish and the cutting tool must be replaced. Accordingly, a need remains for a cutting tool for hard turning with an extended wear life to increase the cutting time for the tool before replacement is needed, thus improving machining productivity.

SUMMARY OF THE INVENTION

This need is met by the coated cutting tool and method of the present invention which are useful for hard turning. The cutting tool of the present invention includes a blank/substrate of polycrystalline cubic boron nitride having a rake surface roughness of no more than about 8 to 10 microinches $R_a$, having a refractory hard coating containing aluminum applied thereto by one of a CVD or PVD technique or combination thereof. Preferably, the coating includes a titanium aluminum nitride layer (e.g., TiAlN) deposited onto the substrate via a PVD technique in a thickness of at least 2 micrometers, and preferably about 2 to 5 micrometers, and more preferably about 3 micrometers in thickness. The PCBN preferably includes at least 40 vol % CBN in addition to the binder.

The coating may alternatively include a lower layer of aluminum oxide (e.g., $Al_2O_3$), deposited with or without underlayers of TiN, TiC, TiCN, TiAlN, TiOCN between it and the substrate, and optionally, with an outer layer, for example, of titanium nitride (TiN). A primary function of the outer layer is to act as a visual wear indicator for the machine operator. This layer is typically lighter colored than the substrate of the tool insert.

The method according to the present invention contemplates the use of a polycrystalline cubic boron nitride cutting tool coated with a titanium aluminum nitride layer applied by a PVD technique for hard turning materials such as hardened steel having a hardness of greater than 45 HRC. The coating may instead include one or more lower layers of aluminum oxide applied via CVD and an upper layer(s) of titanium carbonitride, titanium oxycarbonitride and/or titanium nitride applied via PVD or CVD.

DETAILED DESCRIPTION OF THE INVENTION

Figure 1:
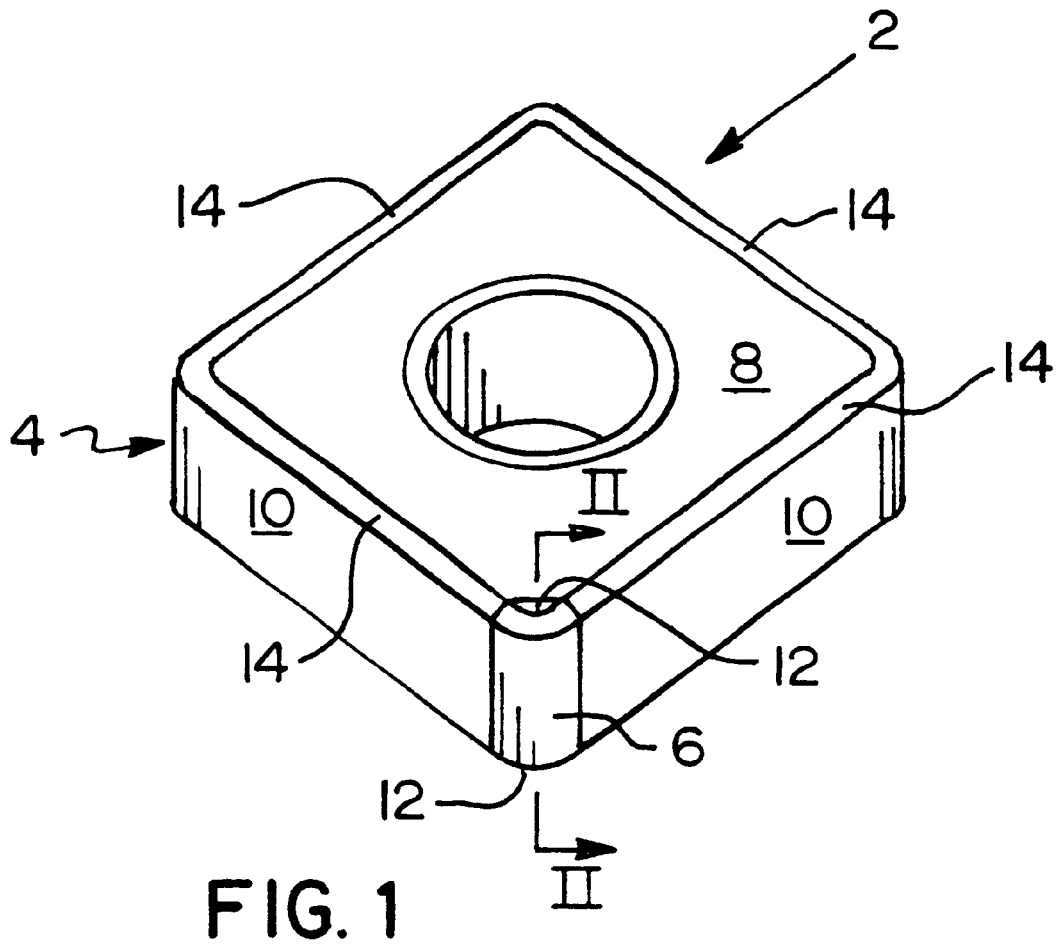
FIG. 1 is a perspective view of a coated cutting tool with a tool body having a substrate brazed thereto.
Figure 2:
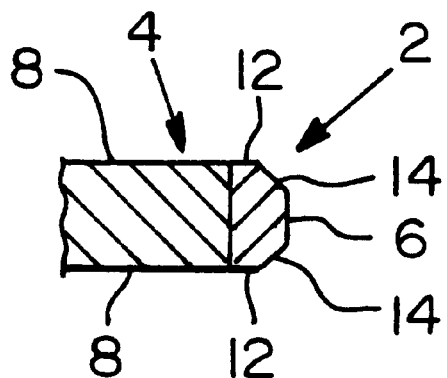
FIG. 2 is a partial cross-sectional view of the cutting tool of FIG. 1 taken along line II—II.

FIGS. 1 and 2 show an exemplary cutting tool insert 2 of the invention including a body 4 and a PCBN blank or substrate 6 brazed to the insert 2. The insert 2 defines a pair of rake surfaces 8 bounded by flank surfaces 10. The substrate 6 includes two cutting edges 12 and is chamfered as shown generally at reference numeral 14. Alternatively, the substrate may extend only partway along the length of the flank surface to form a tool having a single cutting edge (not shown). In addition, the insert 2 may be fitted with an additional blank/substrate 6 at a diametrically opposed corner (not shown) to provide four cutting edges on the tool.

Alternatively, the cutting insert may be composed entirely of PCBN (monolithic PCBN), in which case in the style shown in FIGS. 1 and 2, there would be eight cutting edges.

The present invention includes a coated cutting tool 2 for so-called hard turning of steel. By hard turning it is meant machining of material having a Rockwell hardness ($R_c$) of greater than 45 $R_c$ and more preferably a hardness equal to or greater than 55 $R_c$. The cutting tool or insert 2 includes a body 4 having a pocket formed therein with a hard substrate 6 fitted in the pocket and brazed to the body in a conventional manner. As shown in FIG. 1, the blank or substrate 6 is bounded by the rake surfaces 8 and flank surfaces 10 at one corner of the insert 2.

The body 4 is preferably made by conventional powder metallurgical techniques well-known in the art. A suitable material for the insert body 4 is a metal carbide such as cobalt cemented tungsten carbide. More specifically, the powder components of the body 4 are blended and pressed into a green compact. The green compact is then subsequently sintered, so as to form a substantially fully dense body. In the alternative, a powder blend can be formed into a substantially fully dense body by the simultaneous application of heat and pressure such as, for example, by hot pressing.

The substrate 6 is formed from polycrystalline cubic boron nitride (PCBN). Preferably, the substrate is formed by depositing a sized blend of PCBN powder with a ceramic binder onto a tungsten carbide disc and subjecting the disc bearing the PCBN and binder blend to high pressure at a temperature of about 1500° C. The PCBN binds to the disc and the disc is lapped, polished and cut into the appropriate geometry for fitting into the pocket in the cutting tool body 4, as described above. Preferably, the substrate 6 has a surface roughness $R_a$ of less than about 8 to 10 microinches, more preferably no more than 8 microinches $R_a$ after surface finishing and prior to coating.

A thin wear-resistant coating is then applied to the substrate 6 or the entire insert 2. The coating preferably is a refractory hard coating containing aluminum. One suitable coating compound is titanium aluminum nitride deposited onto the substrate via a physical vapor deposition (PVD) technique in one or more layers. It is believed that the aluminum in the coating of titanium aluminum nitride oxidizes at cutting temperatures during hard turning to produce a film of chemically inert aluminum oxide at the interface of the tool with a chip of the metal work piece produced during hard turning. This phenomenon retards reactions between the metal chip and the surfaces of the cutting tool. The presence of aluminum oxide imparts good hot hardness to the cutting tool during hard turning and also provides thermal insulation (lower heat transfer coefficient) to the cutting tool surfaces. The coating of titanium aluminum nitride is preferably about 2 to 5 micrometers thick, more preferably about 3 micrometers thick.

Alternatively, a one or more layered coating of $Al_2O_3$ may be used as the refractory hard coating. Preferably, a lower layer of $Al_2O_3$ is applied directly to the substrate, (or over a titanium carbide, titanium nitride, titanium carbonitride, titanium aluminum nitride, and/or titanium oxycarbonitride layers) via chemical vapor deposition (CVD) in one or more sublayers in a total thickness of about 20 $\mu$m maximum, preferably 2–6 micrometers of $Al_2O_3$ preferably at a temperature that does not degrade the braze joint or does not degrade the cubic boron nitride. The lower layer of $Al_2O_3$ may be applied to the blank/substrate either before or after the blank is brazed into the pocket of the insert. An upper layer of TICN, TiCNO, TiC, TiAlN, and/or TiN is applied to the lower layer of $Al_2O_3$ via a PVD technique or, alternatively, a CVD method in one or more sublayers to a total thickness of about 5 $\mu$m maximum, preferably 1–2 micrometers.

The present invention further includes a method of machining hard materials such as hardened steel having a Rockwell hardness of greater than 45 $R_c$. According to the inventive method, the cutting tool insert described above having a substrate of PCBN with a refractory hard coating containing aluminum applied thereto via PVD or CVD is used to finish machine hardened steel with a Rockwell hardness of greater than 45 $R_c$, preferably at least 55 $R_c$, to a depth of cut (doc) no more than 0.050 inch and preferably less than 0.025 inch. Preferably, the machining speeds used in turning are 300–600 sfm.

Although the invention has been described generally above, the following particular examples provide additional illustration of the cutting tools made according to the present invention. In the following examples, where a titanium aluminum nitride (TiAlN) coating was used, the ratio of Al/Ti was about 0.66 on an atomic percent basis. While other Al/Ti ratios may also be used, however, Al/Ti ratios of 0.8 to 0.55 are preferred (and more preferably, 0.8 to 0.6) in that these provide excellent adhesion with the PCBN substrate (i.e., greater than or equal to 60 kg in a Rockwell A indention adhesion test) without the use of an intermediate layer, while also providing excellent flank wear and crater wear resistance during machining of hardened steel.

EXAMPLE 1

Various commercially available grades of single edge PCBN cutting tools (ANSI insert type SNMA432T) having a PCBN substrate brazed thereon were coated via a PVD technique with a 3.5 micrometer thick layer of titanium aluminum nitride. Cutting tools (ANSI insert type SNMA432T) having an uncoated PCBN substrate were also evaluated. The uncoated tools and the coated tools were used to dry machine (turning) D3 tool steel (having a Rockwell hardness of $R_c$ 60) under the following conditions: speed of 400 sfm, feed of 0.004 inch per revolution, depth of cut of 0.020 inch, and lead angle of 15°. The times to develop the indicated maximum flank wear on each of the cutting tools are set forth in Table I. The PCBN tools evaluated are further described in Table II.

TABLE I

Time (minutes) to Develop 0.008 inch, 0.010 inch and 0.015 inch of Maximum Flank Wear

| | Uncoated Tool | | | TiAlN (3.5 $\mu$m) Coated Tool | | |
|---|---|---|---|---|---|---|
| PCBN Grade | 0.008 inch | 0.010 inch | 0.015 inch | 0.008 inch | 0.010 inch | 0.015 inch |
| KD050 | 21.75 | 22.58 | 25.77 | 27.00 | 33.20 | 34.60 |
| KD081 | 2.35 | 3.00 | 4.74 | 7.63 | 8.11 | 10.63 |
| KD082 | 3.42 | 3.83 | 4.88 | 2.76 | 6.47 | 14.61 |
| BN250 | 8.25 | 12.56 | 13.92 | >15.00* | — | — |
| MB820 | 6.47 | 9.86 | 12.05 | 21.67 | 30.60 | 44.50 |

*Nose broke at 15 minutes. Maximum flank wear was 0.0052 inch at 15 minutes.

TABLE II

PCBN Grades

| Grade | Source | Nominal Composition, volume % | T-Land Geometry Angle | Chamfer (in.) | Hone Radius (in.) |
|---|---|---|---|---|---|
| KD050 | Kennametal | 50% cBN plus 40% TiC, 6% WC, and 4% AlN, AlB$_2$ in the binder phase | 20° | 0.004 | 0.0019 |
| KD081 | Kennametal | 70% cBN plus TiN binder | 20° | 0.004 | 0.0019 |
| KD082 | Kennametal | 65% cBN plus TiN binder | 20° | 0.004 | 0.0019 |
| BN250 | Sumitomo | 60% cBN plus TiN binder | 25° | 0.0046 | 0.0018 |
| MB820 | Mitsubishi | 60% cBN plus TiN binder | 25° | 0.0052 | 0.0017 |

Based on the data in Table I, the relative improved performance of the coated PCBN tools over the uncoated tools at the indicated levels of wear is tabulated in Table III.

TABLE III

Performance Advantage of TiAlN-coated PCBN Tools Over Uncoated Tools at Indicated Maximum Flank Wear

| PCBN Grade | 0.008 inch | 0.010 inch | 0.015 inch |
|---|---|---|---|
| KD050 | 1.2x | 1.5x | 1.34x |
| KD081 | 3.2x | 2.7x | 2.24x |
| KD082 | 0.8x | 1.7x | 2.99x |
| BN250 | >1.8x | — | — |
| MB820 | 3.35x | 3.35x | 3.69x |

The data in Tables I and III demonstrate that titanium aluminum nitride-coated PCBN tools exhibit improved wear over uncoated tools and that titanium aluminum nitride coatings extend the life of the PCBN cutting tools by 50 to over 300 percent when machining hardened steel under almost all conditions tested.

The improved performance of the coated cutting tools made according to the present invention over uncoated tools was also observed by examination of the rake surface of each cutting tool for crater wear. For example, after 5 minutes of hard turning with the cutting tools produced in Example 1 using PCBN grade BN250, less crater wear of the coated rake surface was seen as compared to the uncoated rake surface. A similar pattern of results was found for each of the other grades of PCBN produced in Example 1.

EXAMPLE 2

Two grades of PCBN substrates were formed into cutting tools and coated via a PVD technique with a 3 micrometer layer of titanium aluminum nitride. Cutting tools having an uncoated PCBN cutting edge were also evaluated. The uncoated tools and the coated tools were used to finish machine induction hardened automotive components formed from 5052H MOD steel having a Rockwell hardness of about 64 $R_c$ at cutting conditions of 350 sfm, 0.005 ipr, 0.026 inch doc, and dry. The insert style was CNMA432T having two cutting edges. The number of components machined per type of tool before wear of the cutting edges caused removal from service are set forth in Table IV.

TABLE IV

Number of Components Hard Turned

| PCBN Grade | Coating | Number of Units |
|---|---|---|
| KD082 | None | 55 |
| KD082 | TiAlN 3 μm | 100 |
| KD050 | TiAlN 3 μm | 80 |

The data in Table IV demonstrates that a PCBN substrate coated with titanium aluminum nitride improves the life of a cutting tool by 82 percent compared to the same uncoated substrate.

EXAMPLE 3

TABLE V

Finish Turning of D3 Tool Steel $R_c$ 60*

| Cutting Tool Substrate | Coating | Time to Develop 0.015" Maximum Flank Wear*, Minutes |
|---|---|---|
| KD200 | None | 4.42 |
| KD200 | TiN (2μ-CVD) | 4.71 |
| KD200 | Al$_2$O$_3$/TiN (CVD) | 8.84 |

*400 sfm, 0.004 ipr, 0.020" DOC, dry cutting, SNMN423T style insert, 15° lead angle.

In the past, high cBN content (i.e., ≧80 vol % cBN) grades such as Kennametal, KD200, were normally not recommended for hard turning finishing applications, cf. Table I, for hard turning finishing grades (i.e., low cBN content <80 vol % cBN). As shown in Table V above, use of the Al$_2$O$_3$/TiN coating doubled the tool life of KD200. The rate of crater wear after five minutes of cutting was also significantly reduced compared to both the uncoated and TiN-coated tools. It is significant to note that the TiN-coated tool provided very little, if any, protection to the KD200 tool; whereas the Al$_2$O$_3$/TiN coating provided the necessary thermal barrier/insulation to improve crater wear resistance, and hence tool life in this finish turning application.

CVD coating was done at about 970–1000° C. with an initial sublayer of Al$_2$O$_3$, then a thin layer of TiOCN, followed by a thicker sublayer of Al$_2$O$_3$, then a thin layer of TiOCN and a final layer of TiN. The Al$_2$O$_3$ total coating thickness was about 5–6 micrometers and the TiN coating thickness was about 1.5 micrometers. KD200 is a monolithic PCBN grade nominally composed of 90 vol % cBN plus AlN, AlB$_2$ and Si$_3$N$_4$ binder.

It will be readily appreciated by those skilled in the art that modifications may be made to the invention without departing from the concepts disclosed in the foregoing description. Such modifications are to be considered as inclusive within the following claims unless the claims, by their language, expressly state otherwise. Accordingly, the particular embodiments described in detail herein above are illustrative only and are not limiting as to the scope of the invention which is to be given the full breadth of the appended claims and any and all equivalents thereof.

What is claimed is:

1. A coated cutting tool for machining hardened steel comprising:
    a substrate comprising polycrystalline cubic boron nitride having a rake surface and a flank surface and a cutting edge for machining hardened steel having a Rockwell C hardness greater than 45; and
    a coating applied to said substrate by one of a PVD or CVD technique, or a combination thereof, comprising at least one layer containing Al.

2. The coated cutting tool as claimed in claim 1 wherein said coating further includes at least one layer selected from the group consisting of titanium nitride, titanium carbide, titanium carbonitride, and titanium oxycarbonitride.

3. The coated cutting tool as claimed in claim 1 wherein said coating further comprising at least one layer of an aluminum oxide.

4. The coated cutting tool as claimed in claim 3 wherein said coating further comprises a plurality of layers of aluminum oxide applied by a chemical vapor deposition technique.

5. The coated cutting tool according to claim 3 wherein the coating comprising at least one layer of titanium aluminum nitride.

6. The coated cutting tool as claimed in claim 1 wherein said coating comprises at least one layer of a titanium aluminum nitride.

7. The coated cutting tool as claimed in claim 1 wherein said coating is about 2–20 μm in thickness.

8. The coated cutting tool of claim 1 wherein the substrate includes a rake surface having a surface roughness of less than or equal to 10 microinches $R_a$.

9. The coated cutting tool of claim 8 wherein said coating is about 2–5 μm in thickness.

10. The coated cutting tool of claim 1 wherein the machining is a finish machining operation having a depth of cut of 0.050 inches or less.

11. The coated cutting tool of claim 1 wherein the coating comprises a titanium aluminum nitride coating having an Al/Ti ratio of 0.8 to 0.55 on an atomic basis.

12. The coated cutting tool according to claim 11 wherein the coating comprises a titanium aluminum nitride coating directly bonded to the polycrystalline cubic boron nitride and having a Rockwell A indent adhesion strength of greater than or equal to 60 kg.

13. The coated cutting tool according to claim 1 wherein the coating comprises a titanium aluminum nitride coating directly bonded to the polycrystalline cubic boron nitride and having a Rockwell A indent adhesion strength of greater than or equal to 60 kg to a rake surface of said substrate, said rake surface having a surface roughness of less than or equal to 10 microinches $R_a$.

14. The coated cutting tool according to claim 13 wherein the titanium aluminum nitride coating has an Al/Ti ratio of 0.8 to 0.6 on an atomic basis.

15. A coated cutting tool for machining hardened material having a hardness value greater than about 45 $R_c$ comprising:

a substrate comprising polycrystalline cubic boron nitride having a rake surface with a surface roughness of no greater than about 10 microinches $R_a$;

a coating of about 2–20 μm in thickness applied to said substrate by one of a PVD or CVD technique comprising at least one layer containing Al; and said coating having a Rockwell A indent adhesion strength of greater than or equal to 60 kg to said rake surface of said substrate.

16. The cutting tool of claim 15 wherein the coating comprises at least one layer of a titanium aluminum nitride.

17. The coated cutting tool according to claim 16 wherein the coating comprising at least one layer of aluminum oxide applied by said PVD technique.

18. The coated cutting tool as claimed in claim 15 wherein said coating further includes at least one layer selected from the group consisting of titanium nitride, titanium carbide, titanium carbonitride, and titanium oxycarbonitride.

19. The coated cutting tool as claimed in claim 15 wherein said coating further comprising at least one layer of an aluminum oxide.

20. The coated cutting tool as claimed in claim 19 wherein said coating further comprises a plurality of layers of aluminum oxide applied by a chemical vapor deposition technique.

21. A method of finish machining a hardened steel having a hardness greater than 45 $R_c$ comprising the steps of:

providing a coated cutting tool comprising a brazed substrate of polycrystalline cubic boron nitride brazed to a cemented carbide substrate, said brazed substrate having a coating comprising at least one layer containing Al applied thereto by one of a PVD or CVD technique or a combination thereof; and machining the hardened steel using said coating cutting tool at a depth of cut of no more than 0.050 inch.

22. The method of claim 21 wherein said coating includes at least one layer selected from the group consisting of a titanium nitride, titanium carbide, titanium carbonitride, and titanium oxycarbonitride.

23. The method of claim 21 wherein said coating further comprising at least one layer of an aluminum oxide.

24. The method of claim 23 wherein said coating further comprises a plurality of layers of aluminum oxide applied by a chemical vapor deposition technique.

25. The method of claim 21 wherein said coating comprises at least one layer of a titanium aluminum nitride.

26. The method according to claim 25 wherein the coating comprises at least one layer of aluminum oxide applied by said PVD technique.

27. The method of claim 21 wherein said polycrystalline cubic boron nitride substrate has a rake surface roughness of no more than about 10 microinches $R_a$.

28. The method of claim 21 wherein said polycrystalline cubic boron nitride substrate has a rake surface roughness of no more than 8 microinches $R_a$.

29. The method of claim 21 wherein the coating has a thickness of about 2–20 μm.

30. A coated cutting tool for machining hardened steel comprising:

a composite insert comprising a body made from a WC containing material having a substrate of a polycrystalline boron nitride material brazed therein and defining a cutting edge on said substrate;

said body having a rake surface and a flank surface bordering said substrate, wherein said rake surface has a surface roughness in an uncoated condition of no more than about 10 microinches Ra;

a coating applied to said substrate by a PVD technique in a thickness of about 2–5 μm comprising at least one layer containing Al; and said coating having a Rockwell A indent adhesion strength of greater than or equal to 60 kg to said rake surface of said substrate.

31. The coated cutting tool of claim 30 wherein said coating further includes at least one layer containing a titanium nitride.

32. The coated cutting tool of claim 30 wherein said coating further includes at least one layer containing a titanium aluminum nitride.

33. The coated cutting tool according to claim 32 wherein said coating further includes at least one layer containing an aluminum oxide.

34. The coated cutting tool of claim 30 wherein said coating has a thickness of 3–4 μm.

35. The coated cutting tool of claim 34 wherein said substrate has a rake surface roughness of no greater than 8 microinches $R_a$.

* * * * *